United States Patent
Bhide et al.

(10) Patent No.: US 7,984,021 B2
(45) Date of Patent: Jul. 19, 2011

(54) OPTIMAL USE OF TRIGGERS FOR DETECTING DATABASE EVENTS

(75) Inventors: Manish Anand Bhide, New Delhi (IN); Ajay Kumar Gupta, New Delhi (IN); Mukul Madhukar Joshi, New Delhi (IN); Mukesh Kumar Mohania, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 2033 days.

(21) Appl. No.: 10/729,166

(22) Filed: Dec. 5, 2003

(65) Prior Publication Data
US 2005/0125371 A1    Jun. 9, 2005

(51) Int. Cl.
*G06F 17/30* (2006.01)
(52) U.S. Cl. ........................................... 707/662
(58) Field of Classification Search ............. 707/1
See application file for complete search history.

(56) References Cited

PUBLICATIONS

Umeshwar Dayal, Eric N. Hanson, Jennifer Widom; "Active Database Systems"; Sep. 1994; Addison-Wesley; 0-24.*
U. Dayal, B. Blaustein, A. Buchmann, U. Chakravarthy, M. Hsu, R. Ledin, D. McCarthy, A. Rosenthal, S. Sarin, M.J. Carey, M. Livny, R. Jauhari "The HiPAC Project: Combining Active Database and Timing Constraints", *ACM SIGMOD Record*, vol. 17, No. 1, pp. 51-70, 1988.

* cited by examiner

*Primary Examiner* — Neveen Abel-Jalil
*Assistant Examiner* — Farhan M Syed
(74) *Attorney, Agent, or Firm* — Gibb I.P. Law Firm, LLC; Derek S. Jennings

(57) ABSTRACT

Triggers are dynamically created and destroyed on an application database. Rules are represented in active databases as ECA (event-condition-action) items, in which an action formulates a reaction to an event and is executed after the rule is triggered when the condition is evaluated to true. The event is defined as an instantaneous and atomic (that is, the event either happens completely, or not at all) point of occurrence within an application. Events can be classified as either database, temporal, or user-defined events, and their type can be either primitive or composite.

17 Claims, 11 Drawing Sheets

OPTIMAL USE OF TRIGGERS FOR DETECTING DATABASE EVENTS

FIELD OF THE INVENTION

The present invention relates to optimizing the use of triggers to detect events in a database.

BACKGROUND

Active functionality is supported in database systems by adding ECA (event-condition-action) rules, in which an action occurs in response to an event and is executed after the rule is triggered and the condition is evaluated true.

Commercial database systems provided by corporations such as International Business Machines Corporation, and Oracle Corporation incorporate limited active functionality by defining triggers on database tables. Simple ECA rules based on primitive database events can be mapped to triggers. These triggers provide a further facility to evaluate conditions relating to the data associated with the event within the code for the trigger. An example of such a database event is "when a employee from HR department leaves his job".

Temporal conditions can also be associated with database events. An example of such an event is "if an error is reported on a weekend". Such events are detected in existing systems by defining a trigger, and checking the time of occurrence of the event using a User Defined Function (UDF), or by any other suitable mechanism implemented in the trigger code. The time of occurrence of the event can also be checked outside the trigger code by notifying an external entity, using a messaging system or some other means.

Triggers that have temporal conditions reside permanently on the application database, and these trigger conditions are checked for every transaction. The trigger fires, however, only when the temporal condition is met.

Commercial databases provide means for disabling triggers for a particular user. Triggers can also be disabled temporarily by defining a trigger lookup table_state, which maintains a list of triggers by name and their status (active="Y" for yes, or "N" for no). The disabling or enabling of triggers is performed manually. That is, some systems change the data in the lookup table.

All of these techniques require that the triggers to be permanently present on the application database, unless the triggers are manually removed from the database. Increasing the number of triggers defined on the system degrades the performance of the system, as triggers affect database performance.

Rules may be triggered when there is new data in the working memory that matches the pattern defined in the rule. The HiPAC project [U. Dayal, B. Blaustein, A. Buchmann, U. Chakravarthy, M. Hsu, R. Ledin, D. McCarthy, A. Rosenthal, S. Sarin, M. J. Carey, M. Livny, R. Jauhari "The HiPAC Project: Combining Active Database and Timing Constraints", ACM SIGMOD Record, vol 17, no 1, pp 51-70, 1988] allows by far the most complex triggering events (including database, transaction and temporal events) of any database rule language. The HiPAC project is apparently the first system to demonstrate active functionality in databases, but many of its proposed features have not been implemented in commercial database systems.

This and other existing systems require triggers to be permanently present and active on application databases, which hampers system performance. A need clearly exists, in view of the observations made herein, to provide a database system that addresses limitations associated with existing techniques for using triggers in database systems.

SUMMARY

A strategy is defined herein for creating and destroying triggers dynamically in a database. Rules are represented in active databases as ECA (event-condition-action) items, in which an action is executed after the rule is triggered and the relevant condition is evaluated to true. The event is defined as an instantaneous and atomic (that is, the event either happens completely, or not at all) point of occurrence within an application that affects the state of the database. Events can be classified as either database, temporal, or user-defined events, and their type can be either primitive or composite.

A context and lifespan can be associated with an event that describes the validity of that event. The context and lifespan can be specified either by time, or with respect to another event. Events can be combined together using various composition operators (such as AND, OR, SEQUENCE, TIMES, NOT, ANY etc.) to formulate complex events or situations. A time span can be associated with each composition operator within a complex event to denote that all events combined with the operator should happen within the defined time interval.

Primitive database events can be mapped to database triggers. The condition attached with the event is evaluated for each transaction related to that event, and if the condition evaluates to true, the rule is triggered. The performance of the system is adversely affected if the constraint attached with the event is temporal (that is, the validity of an event lies within a defined time window). This condition is checked (either at the application level or at the database level) for every transaction, irrespective of whether that transaction has occurred within the time interval. This overhead of checking the conditions for every transaction can cripple the system efficiency of the database, especially if a large number of triggers are defined on the databases.

Conditional events (that have lifespan and/or context) of ECA rules are mapped into database triggers, and then these triggers are optimized by creating and destroying these triggers dynamically such that the correctness of the system is ensured and the database performance is not hampered. The above-mentioned HiPAC project, by contrast, does not address the problem of optimizing the lifespan of triggers based on temporal constraints as occurs with the techniques described herein.

Particular features of the system described herein provide capability to segregate temporal constraints from database events and convert these temporal constraints into separate temporal events. One can globally optimize within a rule by considering the validity of the lifespan of events with respect to the lifespan of other events in the rule. An expiration time can be associated with all events. The lifespan of events is defined based upon the time span of other events in the rule. A lifespan is assumed for events not having a defined lifespan. The triggers are dynamically deployed and removed to optimize the performance of the database system.

DETAILED DESCRIPTION

Figure 1:
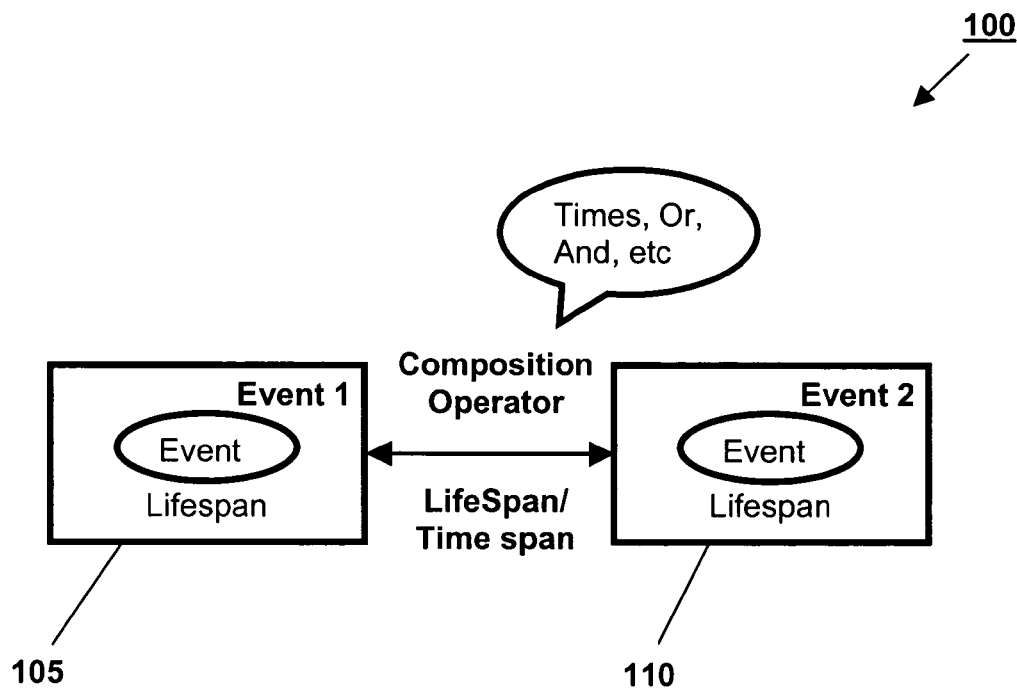
FIG. 1 is a schematic representation of a composite event and its components.

A collection of terms used herein are defined below in the context of FIG. 1 before describing particular aspects of techniques and arrangements described herein. An overview of these techniques is described in relation to FIGS. 2 and 3, before introducing further details in a specific architecture described in relation to FIG. 4.

Definitions

Conditional Event An event is called a conditional event if a lifespan or context attached with the event.

Primitive Event An event is called a primitive event if the event cannot be split into smaller events.

Composite Event When multiple events are combined using composition operators such as AND, OR, NOT, SEQUENCE, TIMES etc. to form a single event the resultant event is called as a composite event. The events taking part in the composite event can either be primitive events or composite events or a combination of these two. Composite event and its components are shown in the diagram 100 of FIG. 1 for a first Event 1 105 and a second Event 2 110. The two events 105, 110, which each comprise the actual event and an associated lifespan, are joined by a composition operator over an associated lifespan or time span as defined below.

Lifespan of an Event If an event has temporal conditions or constraints that restrict the time interval in which the event can occur, then such an event is said to have a lifespan. An example is "If an employee enters the office after lunch time". Due to the temporal constraints, the event "If the employee enters" is valid only if the event occurs between 2 PM and 5 PM (that is, after "lunch time"). Here the lifespan of the event is [2 PM, 5 PM]. The lifespan can also be related to the organizational clock such as "Financial year ending", "Hiring Phase" etc. The lifespan of an event is expressed in terms of an interval of time. Both primitive event and composite event can have a lifespan. If a lifespan is associated with a primitive event, the lifespan is also referred to as as a context of the event. For reasons of simplicity, the term lifespan is used herein in place of context.

Time span of a Composite Event Composite events (and composition operators) can have an additional type of temporal constraint that restricts the time span within which participating events can occur, so that the composite event is said to be true. For example, consider the composite event "If an error is reported thrice within a time span of one hour on a weekend". This is a composite event where the event "error is reported" is combined using the operator TIMES. This composite event has a lifespan [00:00 hours Saturday, 23:59 hours Sunday]. Further, there is an additional temporal constraint that the events should occur within one hour of each other. Such a temporal constraint is referred to as a time span of the composite event. The important distinction between the time span of the composite event and the lifespan of an event is that the time span of a composite event is in terms of a time duration expressed in terms of minutes/hours/seconds. There is no fixed starting time and ending time with the time span, whereas the lifespan of an event has a fixed starting time and ending time.

Rule Rules in databases are provided in ECA (event-condition-action) format, in which an action occurs in response to an event, and is executed after the rule is triggered when the condition is evaluated true.

Rule lifespan An ECA rule can also have a validity period, which is referred to as the lifespan of the ECA rule. For example, a rule concerning financial matters can have a lifespan of one financial year.

Temporal Event An event that is said to occur at a particular time or at regular intervals of time is said to be a temporal event.

Trigger A trigger is a database entity that is used to detect events (non-temporal) occurring in the database. Triggers are represented as ECA (event-condition-action) rules. The event may be an insert, delete or update in a database table. The condition part of the trigger evaluates as a Boolean expression. The action part of the trigger executes only if the condition associated with the trigger evaluates to true.

Overview

Figure 2:
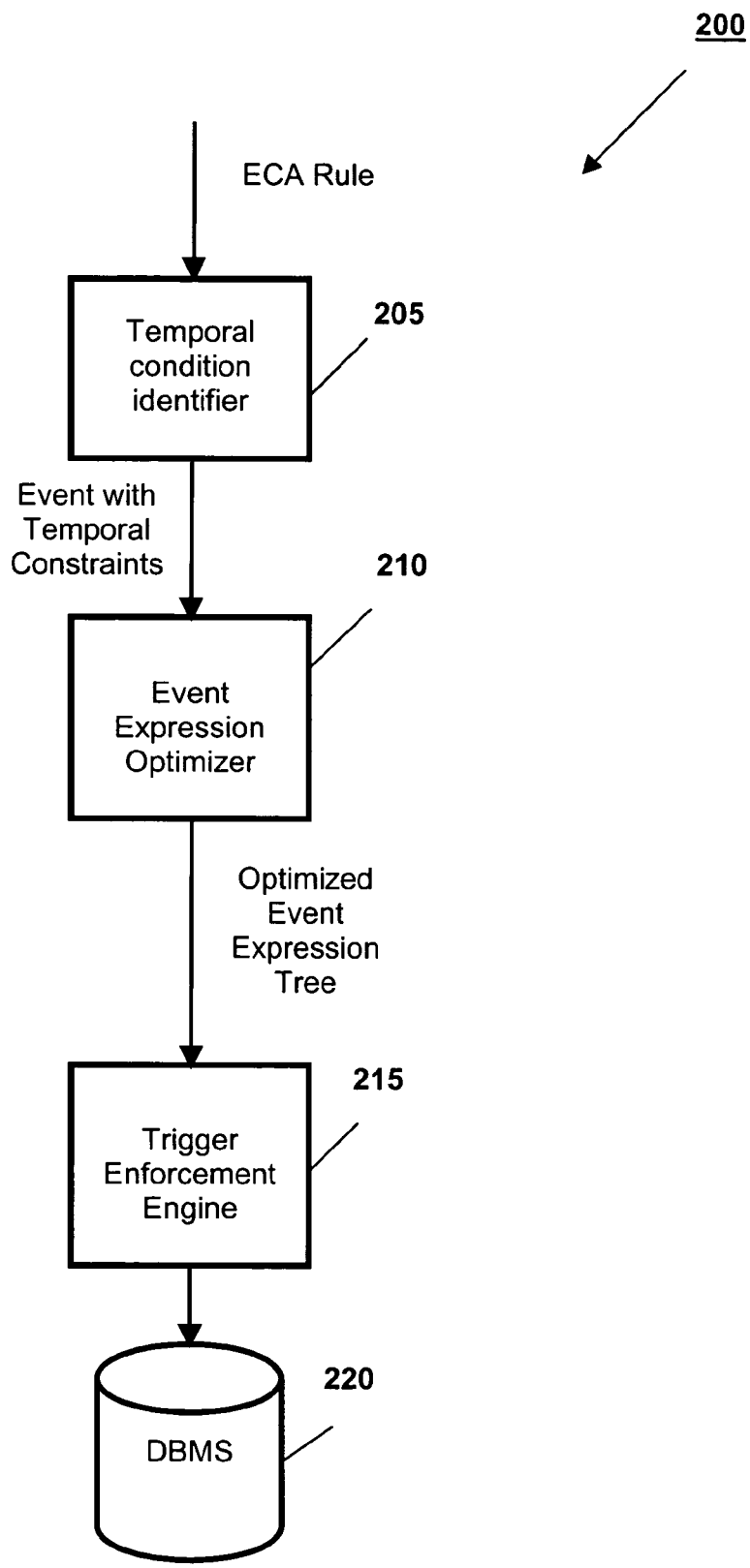
FIG. 2 is a schematic representation of a database system, which operates as described herein.

FIG. 2 presents, in overview, the architecture of a database system that uses triggers as described herein. An ECA rule is supplied to a Temporal Condition Identifier 205, which outputs an event having temporal constraints, as a result of optimization. An Event Expression Optimizer 210 takes the converted event and produces an optimized event expression tree, which is provided to a Trigger Enforcement Engine 215. The Trigger Enforcement Engine 215 provides output directly to a Database Management System (DBMS) 220. This architecture is presented in further detail in FIG. 4.

Figure 3:
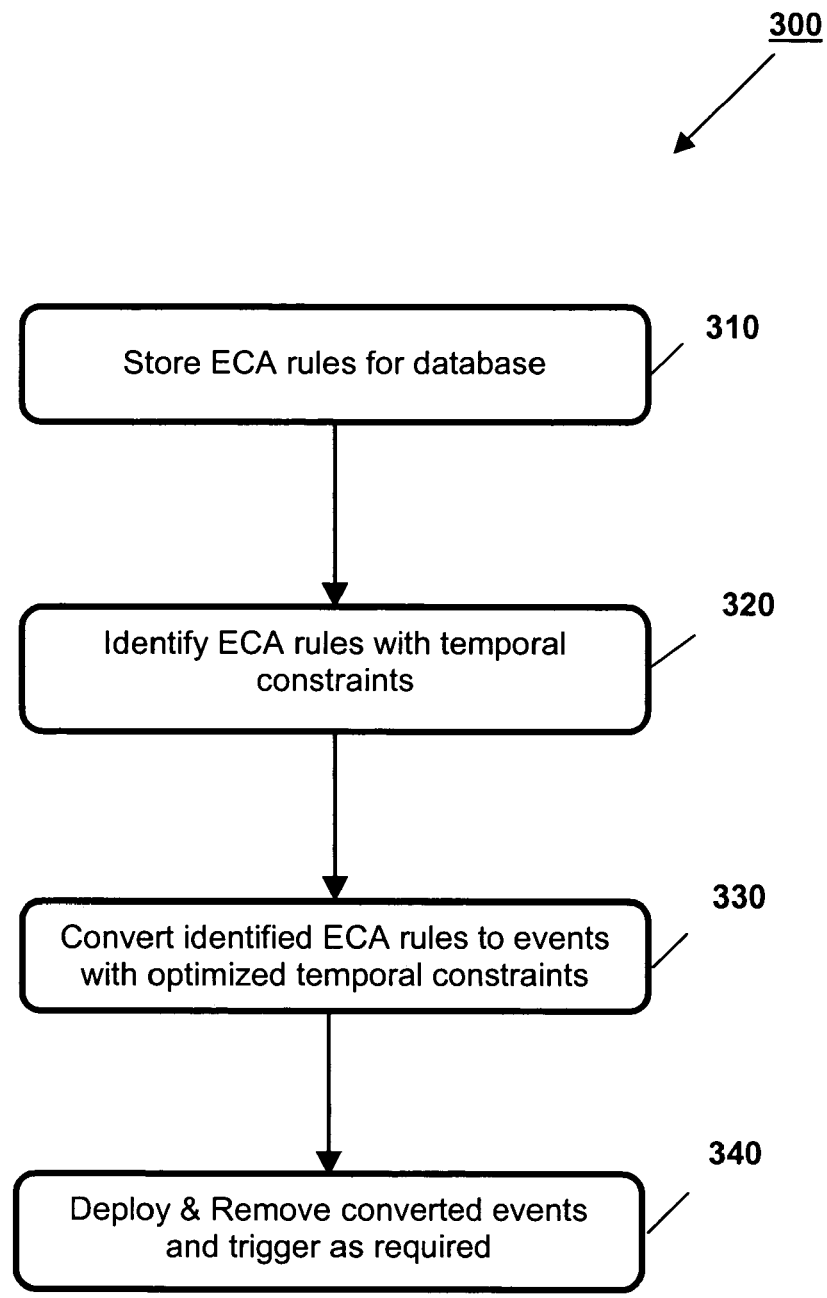
FIG. 3 is a flow chart representing, in overview, steps involved in performing the techniques described herein.

FIG. 3 is a flow chart 300 of steps representing, in overview, steps for performing the techniques described herein. In step 310, ECA rules are stored in a database. In step 320, ECA rules with temporal constraints are identified. In step 330, the identified ECA rules are converted to events with optimized temporal constraints. In step 340, converted events are selectively deployed and removed, as required, to improve database performance.

Conditional events that have temporal constraints are mapped to database triggers. These events can be part of the ECA rules that are used in active databases, or any other application logic, represented in terms of ECA rules or a similar framework. The temporal constraints can be associated with the rules in the form of a lifespan and/or context for the rule.

An example of an ECA rule having temporal constraint (or context) is "If an order is received on weekend and the value of the order is more than $10000, send an email to sales-manager". In this rule, the trigger is defined on the database to detect the placement of an order whose value is more than $10000 (that is, whenever an insertion is made in the "Order" database). This event has a temporal constraint (which is a context) that means that the event should be detected only on a weekend. An example of an ECA rule with a lifespan is "Notify the sales manager if the total sale exceeds $10,000 per day. This rule is valid only for the next 2 months". This rule has a lifespan of 2 months.

The temporal constraints are segregated from the database events, and converted into separate temporal events. The conditional event is thus mapped to a sequence of temporal and database events. These temporal events represent the time at which the triggers are installed and removed from the application databases.

If the lifespan of a rule or event is provided by the rule maker, then the event expression is optimized by pruning the lifespan, if some part of the lifespan is superfluous. If the lifespan is not associated with an event, then the lifespan of such events is determined based on the information of the lifespan and time span of the other events taking part in the rule.

Those triggers that can no longer contribute to the firing of the rule are determined and removed to optimize the performance of the application database. A mechanism to determine the time at which triggers are suitably defined is provided, based on the occurrence of other events in the application domain.

Mapping ECA Rules to Database Triggers

The primitive events are detected using triggers that are generally present on the underlying database even when the lifespan of the rule/event/composite event operator is not active. With increasing number of rules being defined, the triggers defined on the system affect the performance of the query execution adversely. To avoid this undesirable result, the temporal constraints are from separated the database events, and these temporal constraints are instead defined as temporal events.

If the primitive database events have temporal constraints, then the event is converted into a sequence of events that includes the original database event bounded by the temporal events corresponding to the temporal constraints. The same methodology is also used for composite events that have temporal constraints. The crucial difference, however, is that composite-events cannot be detected by using database triggers alone. To detect composite events, there is a need for an external entity, which can keep track of the event occurrence information of the events taking part in a composite event. This external entity is called as the event monitor and is responsible for detecting composite events.

Triggers are defined for the database events taking part in the composite event. The occurrence information of these sub-events is tracked by the event monitor. Based on this occurrence information, as well as the definition of the composite event, the event monitor detects the composite event.

Dynamic deployment of triggers

Figure 4:
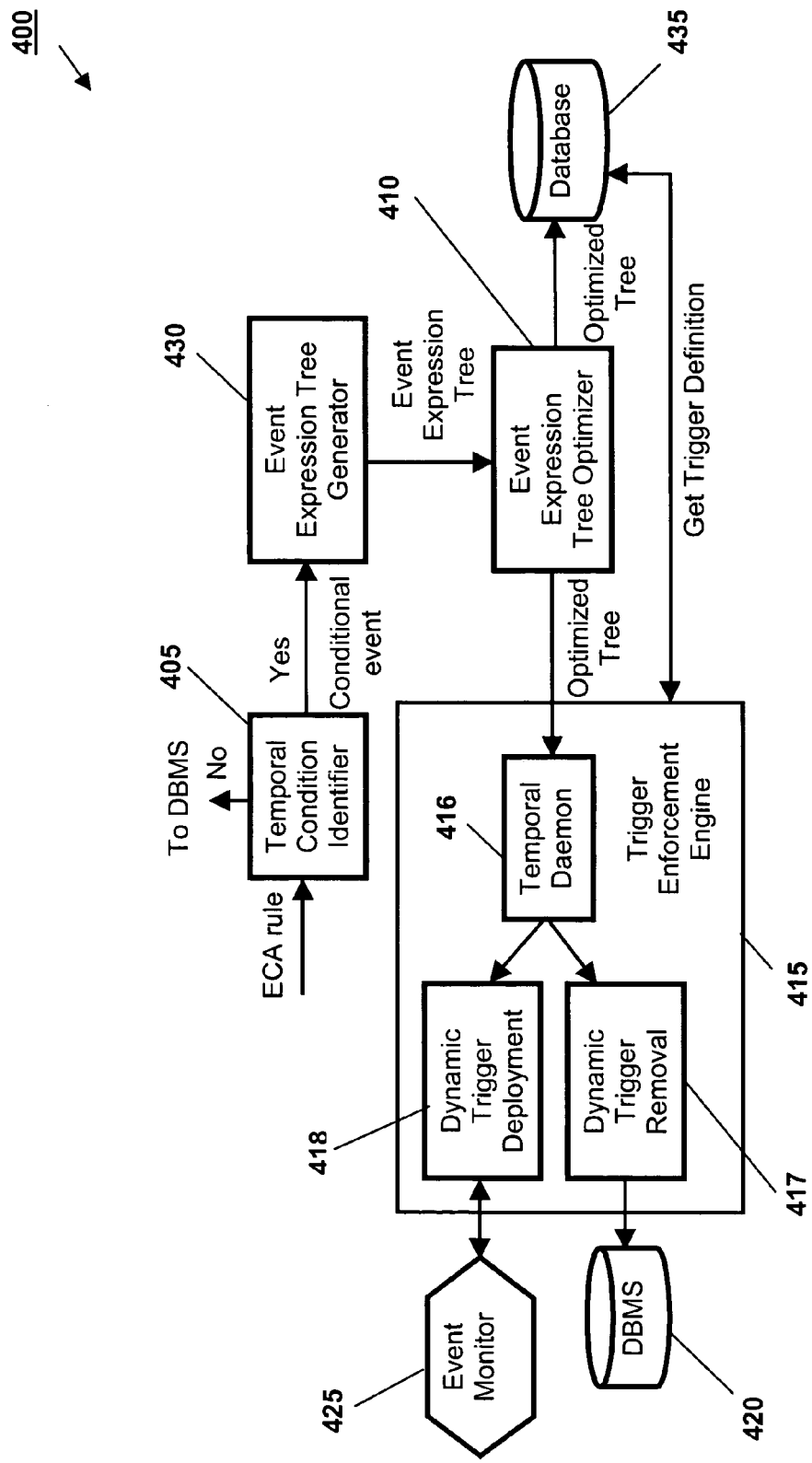
FIG. 4 is a schematic representation of a more detailed architecture for implementing techniques described herein.

The triggers are intelligently deployed using the temporal conditions associated with the event part of the ECA rule. This temporal event can be in the form of the context of events, the lifespan of the rules as well as the lifespan of the composite events. Some representation of the ECA rule is taken as input. Based on these temporal conditions associated with the rule, the described techniques determine a minimal time during which the trigger can be defined in the application database. FIG. 4 presents the high-level view of an architectural framework 400 for dynamic deployment of triggers. The description of each of its components is given below. Related reference numerals are used for related components that appear in common with the schematic representation of FIG. 2.

Temporal Condition Identifier 405: This component 405 takes the ECA representation of the rule and identifies the presence of (a) a lifespan for the rule, (b) the lifespan of an event and (c) the time span of the composite event (and composition operator). If a rule has any of these temporal constraints, then the rule is a possible candidate for optimisation. On the other hand, if the rule does not have any such temporal constraint then the rule cannot be optimised.

Event Expression Tree Generator 430: This module 430 generates an event expression tree that denotes the execution plan (for detection) of an event. There are two types of nodes, leaf and non-leaf nodes, in this tree. Each leaf node denotes an event that may have a lifespan and each non-leaf node denotes an operator (such as AND, OR, SEQUENCE, etc.) that may have a lifespan and a time span. For example, the event expression tree for a composite event $OR(E_1,E_2,E_3)$ AND $E_4$ is described below with reference to FIG. 4.

Event Expression Tree Optimizer 410: This module 410 is responsible for optimising the lifespan of each node, based on the lifespan and time span associated with its parent node. A lifespan is also assigned to all those nodes that do not have a lifespan. During optimisation, the tree can be trimmed if the lifespan of a node falls outside the lifespan of its parent node. The optimisation algorithm is described in Table 1 below. Let i' be the child node of node i. Let $(B_i, E_i)$ and $(B_{i'}, E_{i'})$ be the lifespan of node i and i', respectively, where $B_i$ is the beginning lifespan and $E_i$ is the ending lifespan. $TS(B_i)$ and $TS(E_i)$ denote the timestamp of beginning and ending lifespan of node i, respectively, implying that $TS(B_i)<TS(E_i)$.

Trigger Enforcement Engine 415: The optimised event expression tree has a lifespan with each of the event nodes. This tree representation is fed to the temporal daemon 416 and components for dynamic trigger deployment 418 and dynamic trigger removal 417. The roles and responsibilities of these components are described below in turn.

Temporal Daemon 416: This is a daemon that provides facilities to register alarms and sends notifications when an alarm fires. This daemon registers alarms for the start and the end of the lifespan for each of the events. When an alarm of the start of the lifespan fires, a notification is sent to the dynamic trigger deployment module and when an alarm for the end of the lifespan fires a notification is sent to the dynamic trigger removal module.

Dynamic Trigger Deployment 418: When a notification is received from the temporal daemon 416, this module 418 identifies the triggers that need to be activated at that time. This can be done by querying the database 435 where the mapping between the event id and the trigger definition is stored. Once the module 418 has the event id, the module 418 defines the trigger on the underlying application database 420. An exception to this is in case of the Sequence operator. Consider an event Sequence $(E_1,E_2,E_3)$. In this composite event, if the event $E_1$ has not occurred then the Dynamic Trigger Deployment module 418 does not deploy the trigger for event $E_2$ even if the module 418 receives a notification from the temporal daemon 416. The trigger is deployed only when the event $E_1$ occurs and if the lifespan of the event $E_2$ is active. To support this there is a need for an event monitor 425 that notifies the Dynamic Trigger deployment module 418 once the sub-events, taking part in a Sequence Composite event, fire.

Dynamic Trigger Removal 417: If, during the execution of the rule, a composite event can evidently no longer be true, then the triggers defined for the events constituting the composite event can be removed provided these events are not being re-used in any other rule. The conditions under which a composite event can become false depend on the semantics of the composite event operator. The operators AND, OR, NOT, TIMES and SEQUENCE are considered. But the idea of identification of triggers that are no longer required based on the truth-value of the composite operator is very general and can be applied to all composite event operators.

Dynamic trigger removal occurs when the module 417 receives a notification at the end of the lifespan of any event from the temporal daemon 416. When the notification is received the module 417 removes the trigger for the expired event. A check is made of the validity of the composite events in which the expired event participated. Depending on the semantics of the composite event, the module 417 identifies whether the composite event can no longer be true. If the composite event can no longer fire, then the module 417 removes the triggers that have been defined for this composite event and also removes the alarms registered for this composite event with the temporal daemon 416.

Figure 5A:
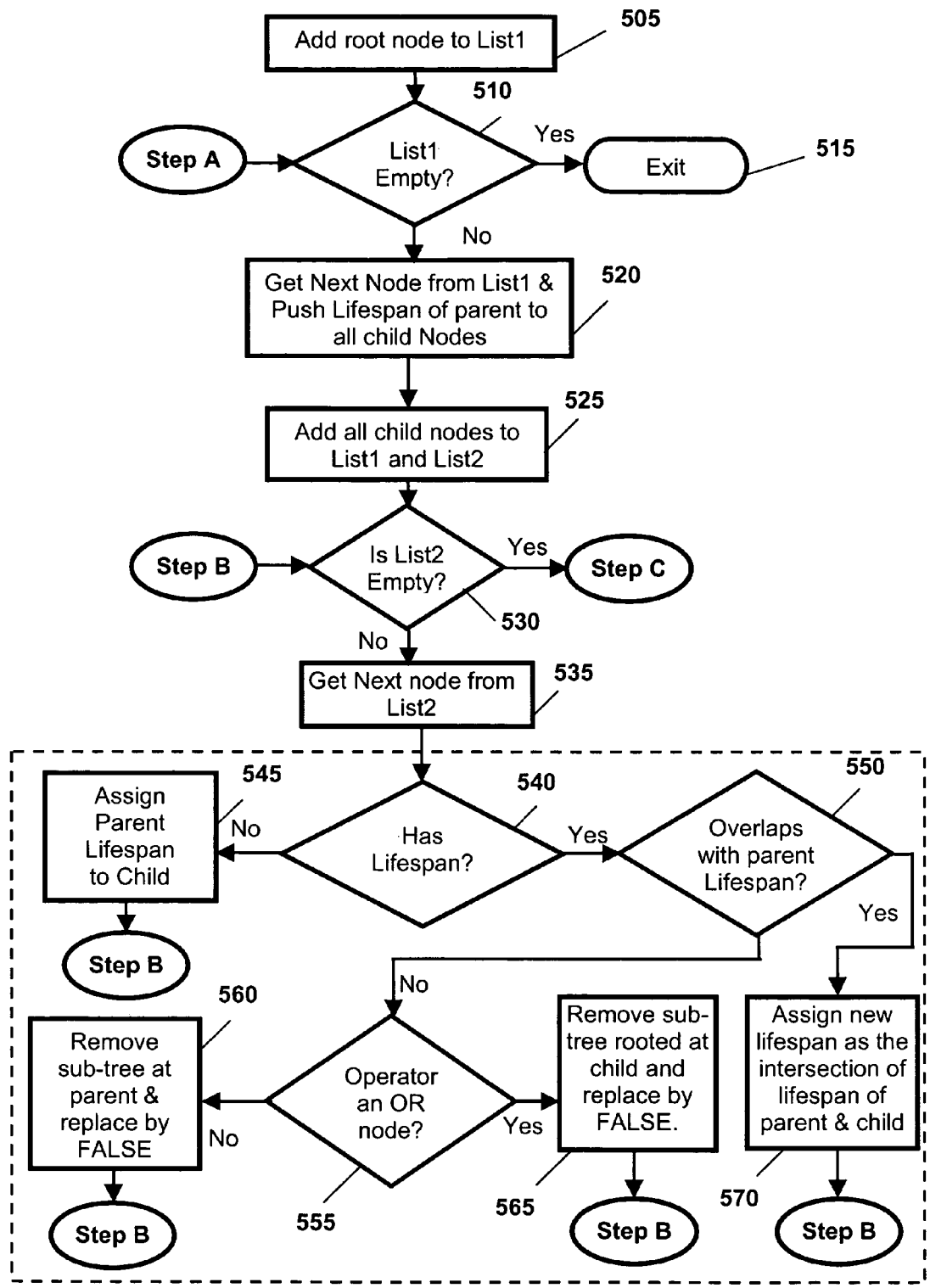
FIGS. 5A and 5B are schematic representations of a more detailed architecture for implementing techniques described herein.
Figure 5B:
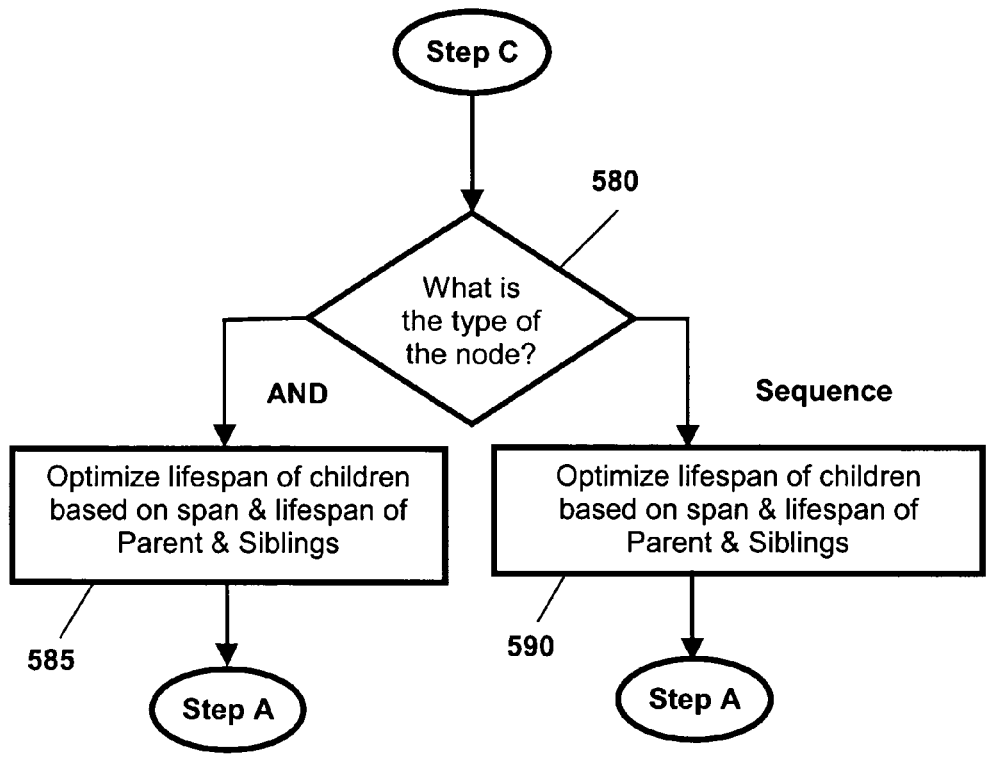

FIGS. 5A and 5B present, in overview, a flowchart of the algorithm outlined in Table 1 above. One may assume that List 1 and List 2 are empty initially, the event expression, lifespan and span of the nodes is available to each node, and if the root node does not have a lifespan a lifespan of $(-\infty, +\infty)$ is assumed.

In step 505, a root node is added to List 1. In step 510, a check is made to determine whether List 1 is empty. If so, the procedure is exited in step 515. Otherwise, in step 520 the next node is obtained from List 1 and the lifespan of the parent is pushed to all the parent node's child nodes. In step 525, all such child nodes are added to List 1 and List 2. In step 530, a check is then made to determine whether List 2 is empty, If so,

TABLE 1

Begin algorithm
  (a) Push the lifespan of each node, say i, starting from the root node in a top-down fashion in the tree, to all its immediate child nodes. If the root node does not have a lifespan, a lifespan of $(-\infty, +\infty)$ is assigned.
  (b) For each child node i', check whether node i' has its lifespan or not.
      (i) If No, then assign the life span of node i to node i'.
      (ii) If yes, check the lifespan of the child node whether the node is overlapping with the lifespan of the parent node. That is, whether either $TS(B_i) <= TS(B_{i'})$ or $TS(E_i) \geq TS(E_{i'})$ is true.
          1. If Yes, then the new lifespan of node i' is $(Max(TS(B_i), TS(B_{i'})), Min(TS(E_i), TS(E_{i'})))$.
          2. If No (that is both the parent lifespan and the child node lifespan do not overlap), then
              (a) If the operator associated with node i is AND, SEQUENCE or TIMES, remove the sub-tree rooted at node i. Replace the node i by FALSE and re-evaluate the event-expression tree and start from step (a).
              (b) If the node is OR, remove the sub-tree rooted at node i' and also remove the edge connecting node i to i'.
  (c) If the node i has time span associate with it and its type is AND, then
      (i) Find the highest timestamp of beginning lifetime from the set of beginning lifespan of all its child nodes, say $TS(B_{i'})$
      (ii) Subtract the time span of node i from this timestamp $TS(B_{i'})$. Let this value be $S_{i'}$.
      (iii) Replace the timestamp of beginning lifespan of each child node (say i') of node i by $S_{i'}$ if it is less than $S_{i'}$. If this new beginning lifespan is greater than $E_{i'}$, then remove the sub-tree rooted at node i. Remove all the ancestors of node i (and their children) till you reach the child of an OR node or the root node. If the root node is reached, the rule never fires. If a child of an OR node is reached, remove that child and its edge with its parent and execute step (a) for the parent OR node.
      (iv) Find the lowest timestamp of ending lifetime from the set of ending lifespan of all child nodes, say $TS(E_{i'})$
      (v) Add the time span of node i into this timestamp $TS(E_{i'})$. Let this value be $S_{i'}$
      (vi) Replace the timestamp of ending lifespan of each child node (say i') of node i by $S_{i'}$ if it is more than $S_{i'}$. If the new ending lifespan is greater than $B_{i'}$, then remove the sub-tree rooted at node i. Remove all the ancestors of node i (and their children) until one reaches the child of an OR node or the root node. If the root node is reached, the rule never fires. If a child of an OR node is reached, remove that child and its edge with its parent and execute step (a) for the parent OR node.
      (vii) New lifespan of node i' = $(Max(B_{i'}, S_{i'}), Min(E_{i'}, S_{i'}))$.
  (d) If the node i has time span associate with it and its type is SEQUENCE, then
      (i) Optimise the lifespan of its child nodes (except the first node) further based on the lifespan of the first node. For each consecutive pair of nodes in the sequence (starting from the first), say i', i''', of node i, where first node is i', perform the following steps.
          1. If $TS(B_{i'}) > TS(B_{i''})$, then set $TS(B_{i''}) = TS(B_{i'}) + \Delta t$ (where $\Delta t$ is some incremental time),
          2. If $TS(B_{i''}) > TS(E_{i''})$, remove the sub-tree rooted at node i. Remove all the ancestors of node i (and their children) till you reach the child of an OR node or the root node. If the root node is reached, the rule never fires. If a child of an OR node is reached, remove that child and its edge with its parent and execute step (a) for the parent OR node.
          3. If $TS(E_{i'}) > TS(E_{i''})$, then $TS(E_{i'}) = TS(E_{i''}'') - \Delta t$ (where $\Delta t$ is some incremental time),
          4. If $TS(B_{i'}) > TS(E_{i'})$ remove the sub-tree rooted at node i. Remove all the ancestors of node i (and their children) till you reach the child of an OR node or the root node. If the root node is true, the rule never fires. If a child of an OR node is reached, remove that child and its edge with its parent and execute step (a) for the parent OR node.
      (ii) Repeat steps of (c).
Push the new lifespan to its immediate child node.
Repeat steps (b) to (e) until the lifespan of each leaf node has been recomputed.
End Algorithm processing proceeds to step 580 depicted on FIG. 5B and described below. If List 2 is not empty, then the next node is obtained from List 2 in step 535.

The block of FIG. 5A depicted in a dashed outline and comprising steps 540 to 570 ensures that each of the child nodes has a lifespan, the lifespan of a child is within the lifespan of its parent, and events that can never occur are removed.

In step 540, a check is made of whether this mode, the next node obtained from List 2, as a lifespan? If there is no lifespan for this node, a lifespan of the parent node is assigned to the child node in step 545. Processing then returns to 530 and this sequence of steps 530, 535, 540, 545 for any other nodes of List 2 with a lifespan. Otherwise, processing proceeds via steps 550 to 570 for nodes that do have a lifespan.

In the node is determined to have a lifespan in step 540, then a further check is made in step 550 to determine whether the lifespan overlaps with the lifespan of the parent. If the parent-child lifespans do not overlap, a check is made in step 555 of whether the operator is an OR node. If the operator is not an OR node, the sub-tree is removed at the parent node and replaced by FALSE in step 560. Otherwise, if the operator is an OR node then the sub-tree rooted at the child is removed and replaced by FALSE in step 565. Processing then cycles back to step 530. Alternatively, if the parent and child lifespans are found to overlap in step 550, then new lifespans are assigned to both parent and child as the intersection of the respect lifespans of the parent and child nodes. In other words, the parent and child lifespans are restricted to the common time during which the lifespans overlap.

This procedure of determining lifespans, and removing redundant nodes, returns in each case to step 530 until all the nodes of List 2 are exhausted. When this occurs, step 580 is performed by determining the type of the node. Depending on whether the node is an AND node, or a Sequence node, the lifespan of children nodes are optimized base on the span and lifespan of the parent nodes and sibling nodes in respective steps 585 and 590. In each case, processing returns after this optimization to step 510.

Optimization using AND, represented in FIG. 5B by step 585, has the following features. The starting lifespan of an event E1 should be within X time units of the ending lifespan of any event E2 occurring before E1 (where X is the span) The ending lifespan of an event E1 should be within X time units of the starting lifespan of any event E2 occurring after E1 (where X is the span).

Optimization using Sequence, represented by step 590, has following features. The lifespan of an event E2 should not start before the lifespan of an event E1 occurring before E2 in the sequence.

The starting lifespan of an event E1 should be within X time units of the ending lifespan of any event E2 occurring before E1 (where X is the span). The ending lifespan of an event E1 should be within X time units of the starting lifespan of any event E2 occurring after E1 (where X is the span).

Figure 6:
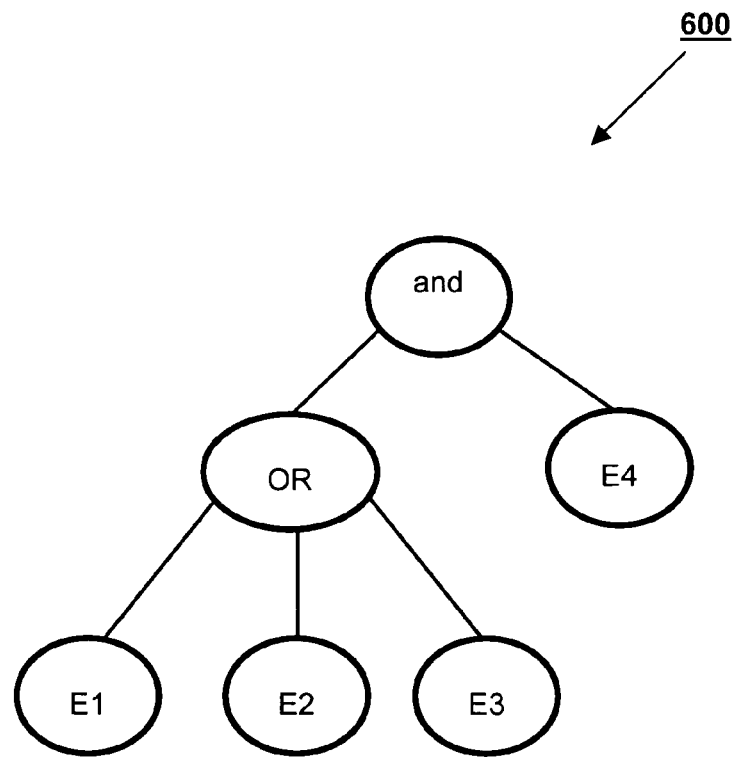
FIG. 6 is a schematic representation of an event expression tree.

Table 2 below presents this same algorithm for the example presented in FIG. 6. FIG. 6 shows the event expression tree 600 for the composite event OR(E1,E2, E3) AND E4. In this expression E1, E2, E3 and E4 are database events. The lifespan of the event E1 is {13,16}, that of event E2 is {16, 18}, event E4 is {18,21}. The event E3 does not have a predefined lifespan. The lifespan of the AND node is {12,20} and its time span is 3 time units and the lifespan of the OR node is {11,17}. The tree structure of FIG. 6 implies parent/child/sibling relations between events/nodes of the tree.

TABLE 2

| | |
|---|---|
| Step (i) | Push the lifespan of AND node to OR node and to $E_4$ |
| Step (ii) | The lifespan of the E4 node is reduced to {18, 20} as the initial lifespan {18, 21} lies outside the lifespan of the parent node, that is {12, 20}. Similarly the lifespan of the OR node is trimmed from {11, 17} to {12, 17}, the lifespan of event E1 is (15, 16) that of event E2 is (16, 17) and E3 is (15, 17). |
| Step (iii) | AND node has a span of 3 time units.<br>1. Higher timestamp of beginning lifetime is 18 (from {12, 19} and {18, 19})<br>2. $S_i = 18 - 3 = 15$<br>3. Replace the beginning lifetime of AND node by 15<br>4. Lower timestamp of ending lifetime is 17<br>5. $S_m = 17 + 3 = 20$<br>6. Ending lifetime of each OR and $E_4$ does not change<br>7. New lifetime of AND node is {15, 17} |
| Similarly $E_4$ lifetime is {18, 19}. | |

Now consider the example event expression of FIG. 6. The Trigger Enforcement Engine 415 obtains the optimised tree that has a lifespan for all the events in the event expression. The temporal daemon 416 defines alarms for the start and end of the various events. Thus at time 15, the Dynamic Trigger Deployment module 418 receives an alarm to define trigger for event $E_1$ and $E_3$. This module gets the trigger definition from the database 435 and defines the trigger on the application database 420. The Dynamic Trigger Removal component 417 is invoked at the expiry of a lifespan. If at time 17, the Dynamic Trigger Removal component 417 finds that the event $E_3$ and the OR composite event has not occurred even once in its lifespan, then removes the temporal alarms for events $E_4$ and deletes the trigger defined for $E_3$. This is done in the given situation the composite event AND is never true. The occurrence information of event $E_1$ and $E_2$ can be obtained by querying the Event Monitor 425.

Performance Results

Figure 7:
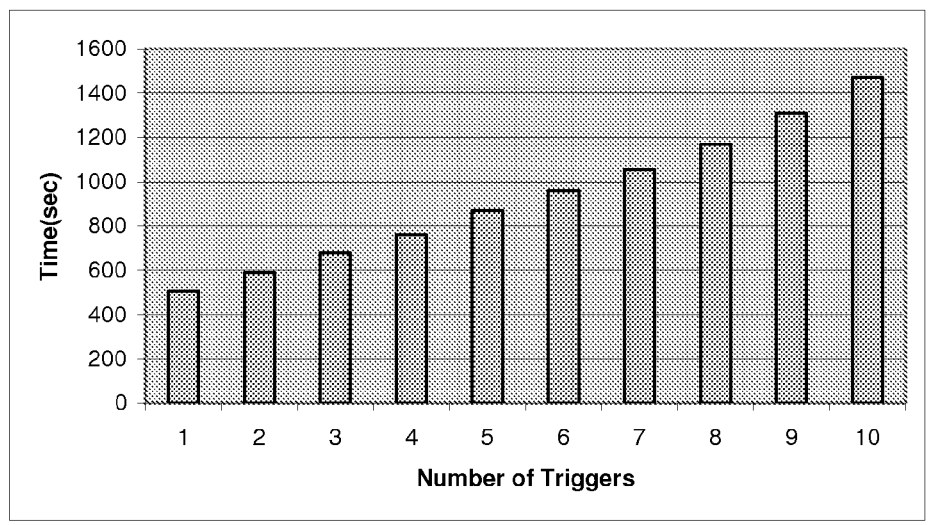
FIGS. 7 to 9 are graphs of performance results relating the techniques described herein.

Some experimental results are now presented. Several different experiments have been conducted using a commercial database with initial cardinality of a relation (that is, total number of records) having 150,000 and every update transaction on a table updates 5 records (tuples) on average in that table. In a first experiment, the number of transactions on a table is fixed, but the number of triggers on the same table is increased. For fixed 10000 update transactions and number of triggers varying from 1 to 10, the total execution time keeps increasing and is shown in the graph 700 of FIG. 7.

As the number of triggers increase, the time taken for the transactions increases. An important point to note is that the time increases drastically with the increase in the number of triggers defined on the database. Hence if the ECA rules are detected using triggers and if these triggers are present permanently on the database, the performance of the system will degrade drastically. Therefore, creating and destroying these triggers is necessary if the ECA rules have temporal constraints.

Figure 8:
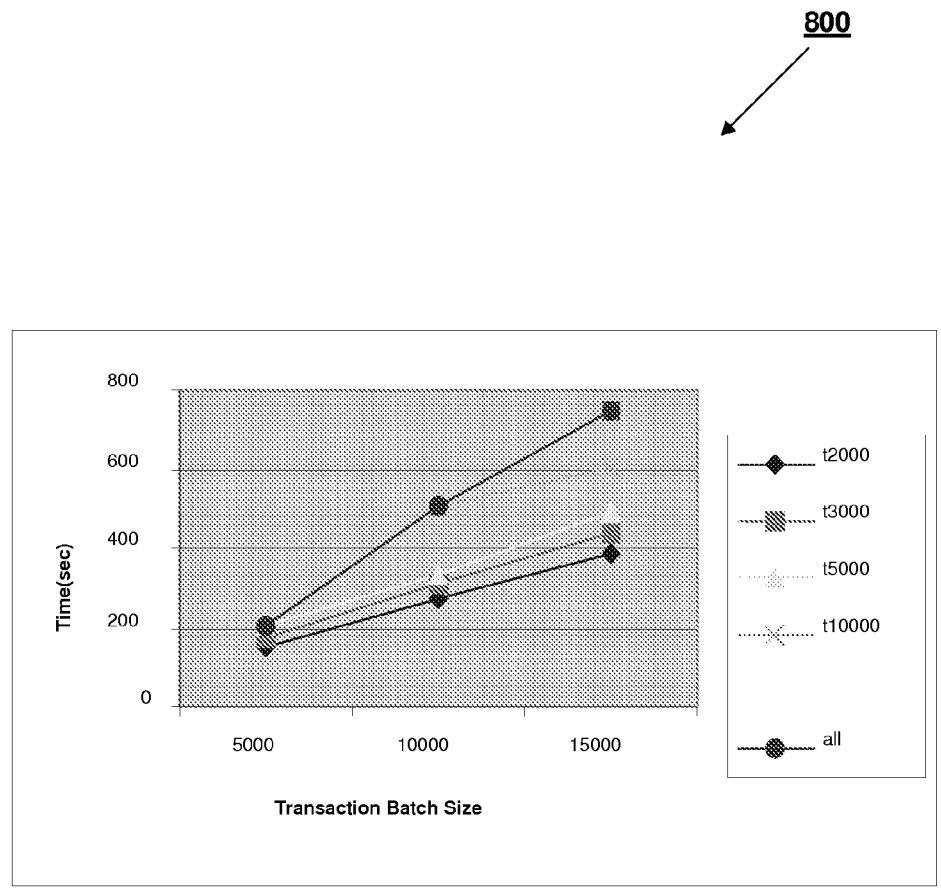

In a second experiment, a graph 800 of the results of which is presented in FIG. 8, the X-axis indicates the number of transactions (that is, transaction batch size) and the Y-axis denotes the time taken to execute these transactions when trigger is present for some number of transactions (or during some time interval) in the batch and then these triggers were removed. For example, t2000 indicates that the trigger needs to be checked in 2000 transactions (during the time interval defined in the trigger) in each batch size.

If the transaction occurs outside the time interval defined in the trigger, there is no point of checking the trigger and then that trigger is removed. The graph 800 shows that the maximum time is required when the triggers are present for the entire time duration as compared to the other cases. This corresponds to the situation when the triggers are permanently present on the databases. When temporal constraints are present in the ECA rules, the described techniques remove the triggers when not required. That is, the triggers are not present for the entire time duration. Hence, this graph 800 corresponds to the other three curves (t2000, t3000, t5000). Hence, this experiment clearly indicates that the time required for executing the transaction is reduced and hence the performance of the database is improved.

Figure 9:
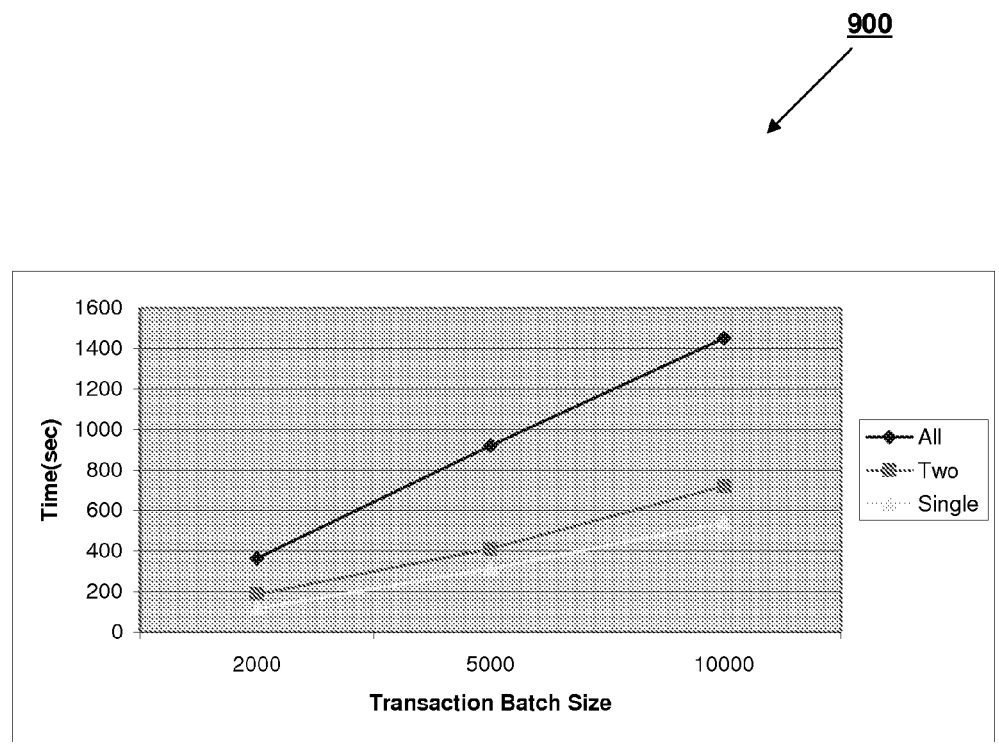

In a third experiment, 10 triggers are installed in a database and were present all the time (during some time interval) and measured the total time taken to perform the transactions in the batch. Assume all these triggers have temporal conditions and that these triggers are not valid all the time. Graph 900 of FIG. 9 presents the total time taken for different number of triggers active at any given instance of time. All 10 triggers in this experiment are installed and removed dynamically, but all of these triggers are present in the database only for a short duration.

FIG. 9 shows that when all the triggers are active for the entire duration, the time required to execute the transaction is much higher than that required when only 1 or 2 triggers are active at any given point of time. The technique described herein optimizes the use of triggers and hence reduces the number of triggers defined on the database at any given point of time. Hence this graph 900 indicates that the described techniques reduce the time required to execute the transactions in the database.

Software Implementation

The components presented in FIG. 2 are implemented as software code. These components can be coded in any suitable programming language, such as the Java, or C programming languages. The Trigger Enforcement Engine can create or delete triggers from the databases using the JDBC/ODBC connectivity. The ECA rule can, for example, be represented as an Extensible Markup Language (XML) document. There can be other forms of representation, but the XML format may be conveniently used because of its structured nature and ease of handling. This XML document specifying the ECA rule is given to the Temporal Condition Identifier. The temporal condition identifier uses an XML parser (which can be implemented using Java, or any other suitable programming language). As an example, XML parser (XML4J) provided by the International Business Machines (IBM) Corporation can be used for implementing the temporal condition identifier. This module identifies the type of the XML policy based on the tags that are present in the XML document. The Event Expression Optimizer is Java Code, which implements the logic given in Table 1 above. The code first converts the XML file into a tree data structure. The code operates on this tree data structure and does the operations detailed out in Table 1.

The optimized tree representation of the policy is provided to the Trigger Enforcement Engine, which is implemented as Java code and uses the JDBC/ODBC bridge to perform operations on the Databases. The Trigger Enforcement Engine uses the JDBC/ODBC bridge to define the triggers on the underlying database. The Trigger Enforcement Engine also comprises a temporal daemon, which is implemented using Java Threads. The DB2 database, also provided by IBM Corporation, can be used though any other commercial database such as provided Oracle Corporation and others can also be used.

Computer Hardware and Software

The techniques described herein do not require changing an existing database. Databases have "in-built" support for defining triggers. The event part of the ECA rule can be detected by using these triggers. These triggers are permanently present on databases, even if temporal constraints are attached with the event. The techniques described herein provide a mechanism by which the triggers need not be permanently present on the database. This advance can be implemented by code written in programming languages, such as Java, C (any another appropriate language) and by using the JDBC/ODBC bridge. In summary, no changes are required in the actual database application.

Figure 10:
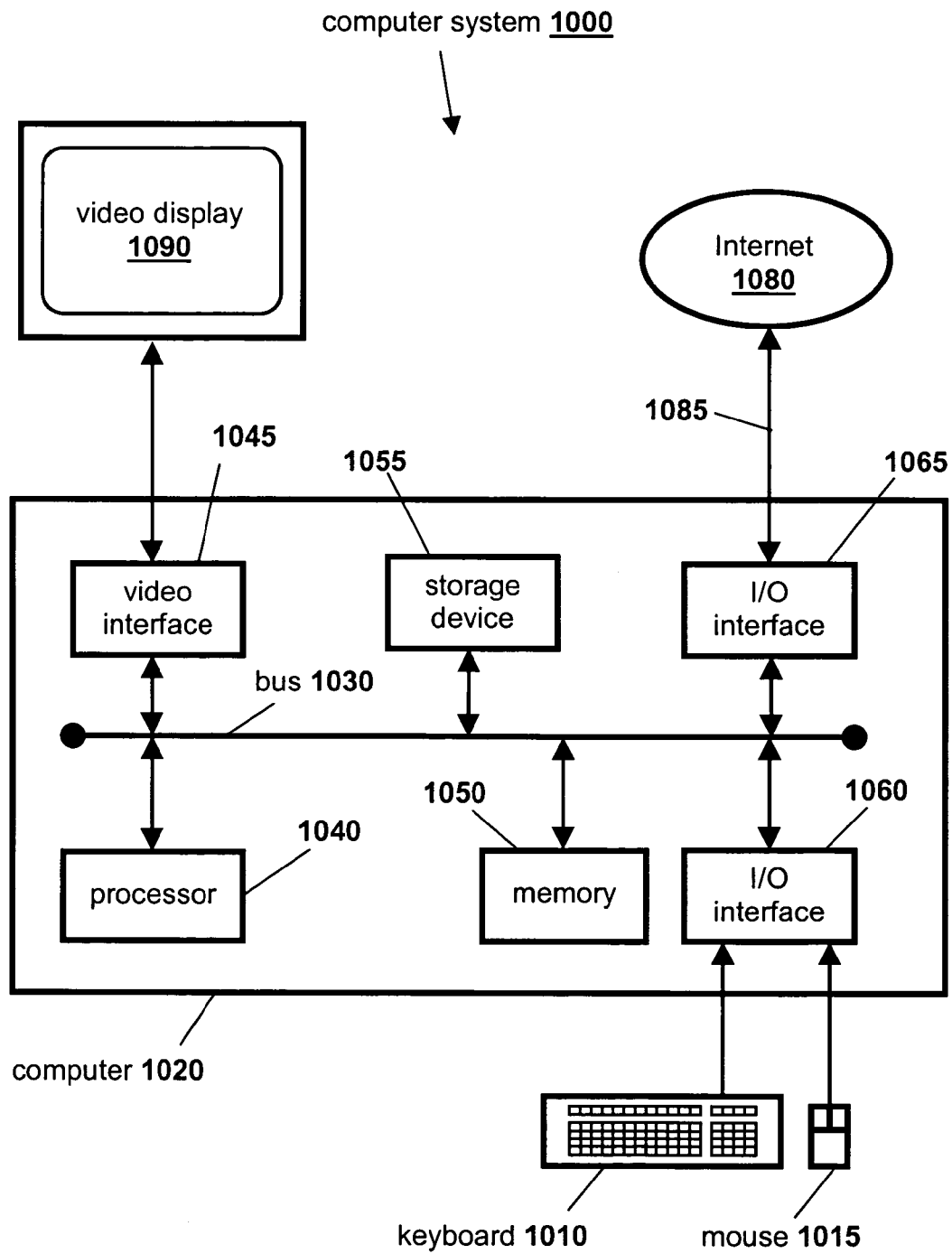
FIG. 10 is a schematic representation of a computer system suitable for performing the techniques described herein.

FIG. 10 is a schematic representation of a computer system 1000 that can be used to implement the database-related techniques described herein. Computer database software executes under a suitable operating system installed on the computer system 1000. The computer database software is programmed using any suitable computer programming language, and may be thought of as comprising various software code means for achieving particular steps.

The components of the computer system 1000 include a computer 1020, a keyboard 1010 and mouse 1015, and a video display 1090. The computer 1020 includes a processor 1040, a memory 1050, input/output (I/O) interfaces 1060, 1065, a video interface 1045, and a storage device 1055.

The processor 1040 is a central processing unit (CPU) that executes the operating system and the computer software executing under the operating system. The memory 1050 includes random access memory (RAM) and read-only memory (ROM), and is used under direction of the processor 1040.

The video interface 1045 is connected to video display 1090 and provides video signals for display on the video display 1090. User input to operate the computer 1020 is provided from the keyboard 1010 and mouse 1015. The storage device 1055 can include a disk drive or any other suitable storage medium.

Each of the components of the computer 1020 is connected to an internal bus 1030 that includes data, address, and control buses, to allow components of the computer 1020 to communicate with each other via the bus 1030.

The computer system 1000 can be connected to one or more other similar computers via a input/output (I/O) interface 1065 using a communication channel 1085 to a network, represented as the Internet 1080.

The computer software may be recorded on a portable storage medium, in which case, the computer software program is accessed by the computer system 1000 from the storage device 1055. Alternatively, the computer software can be accessed directly from the Internet 1080 by the computer 1020. In either case, a user can interact with the computer system 1000 using the keyboard 1010 and mouse 1015 to operate the programmed computer software executing on the computer 1020.

Other configurations or types of computer systems can be equally well used to implement the described techniques. The computer system 1000 described above is described only as an example of a particular type of system suitable for implementing the described techniques.

CONCLUSION

The invention described herein has general application to databases, and more particularly to task of detecting database events. Various alterations and modifications can be made to the database techniques and arrangements described herein, as would be apparent to one skilled in the relevant art.

We claim:

1. A method of monitoring events in a database, said method comprising:
   storing in said database at least one database rule;
   mapping temporal constraints of an event of said database rule to corresponding temporal events;
   changing said temporal constraints associated with said temporal events based upon related temporal constraints for related events of said database rule to provide changed temporal constraints;
   registering alarms associated with a start and end of a lifespan of each of said temporal events;
   selectively deploying and selectively permanently removing ones of said temporal events from said database based upon said changed temporal constraints;
   upon reaching said end of said lifespan of each of said temporal events, permanently removing from said database said alarm associated with said ones of said temporal events permanently removed from said database;
   combining said temporal events using a sequence operator to form a composite event; and
   associating a lifespan to said composite event using said sequence operator.

2. The method as claimed in claim 1, further comprising removing from the database temporal events that cannot evaluate as true.

3. The method as claimed in claim 1, further comprising limiting a lifespan of at least one of said temporal events to an overlapping period of a lifespan of a parent event.

4. The method as claimed in claim 1, further comprising changing a lifespan of one of said temporal events to omit periods in which said one of said temporal events cannot evaluate as true.

5. The method as claimed in claim 1, further comprising assigning a lifespan of at least one of said temporal events having an undefined lifespan as a lifespan of a parent event.

6. The method as claimed in claim 1, further comprising propagating a lifespan or context of a parent node to all children nodes of said parent node.

7. The method as claimed in claim 1, wherein a lifespan of at least one of said temporal events is expressed as a predetermined duration of time.

8. The method as claimed in claim 1, wherein said lifespan of said composite event is dependent upon an associated event.

9. The method as claimed in claim 1, wherein a lifespan of at least one of said temporal events ends at a predetermined time, or recurs at a predetermined period of time.

10. The method as claimed in claim 1, further comprising storing said database rule as an event-condition-action (ECA) rule.

11. A database recorded on a non-transitory computer storage medium comprising:
    software code means for storing in said database at least one database rule;
    software code means for mapping temporal constraints of an event of said database rule to corresponding temporal events;
    software code means for changing said temporal constraints associated with said temporal events based upon related temporal constraints for related events of said database rule to provide changed temporal constraints;
    software code means for registering alarms associated with a start and end of a lifespan of each of said temporal events;
    software code means for selectively deploying and selectively permanently removing ones of said temporal events from said database based upon said changed temporal constraints;
    software code means for, upon reaching said end of said lifespan of each of said temporal events, permanently removing from said database said alarm associated with said ones of said temporal events permanently removed from said database;
    software code means for combining said temporal events using a sequence operator to form a composite event; and
    software code means for associating a lifespan to said composite event using said sequence operator.

12. A system for monitoring events in a database, said system comprising a processor performing a method comprising:
    storing in said database at least one database rule;
    mapping temporal constraints of an event of said database rule to corresponding temporal events;
    changing said temporal constraints associated with said temporal events based upon related temporal constraints for related events of said database rule to provide changed temporal constraints;
    registering alarms associated with a start and end of a lifespan of each of said temporal events;
    selectively deploying and selectively permanently removing ones of said temporal events from said database based upon said changed temporal constraints;
    upon reaching said end of said lifespan of each of said temporal events, permanently removing from said database said alarm associated with said ones of said temporal events permanently removed from said database;
    combining said temporal events using a sequence operator to form a composite event; and
    associating a lifespan to said composite event using said sequence operator.

13. A non-transitory program storage device medium readable by computer, tangibly embodying a program of instructions executable by said computer to perform a method of monitoring events in a database, said method comprising:
    storing in said database at least one database rule;
    mapping temporal constraints of an event of said database rule to corresponding temporal events;
    changing said temporal constraints associated with said temporal events based upon related temporal constraints for related events of said database rule to provide changed temporal constraints;
    registering alarms associated with a start and end of a lifespan of each of said temporal events;

selectively deploying and selectively permanently removing the temporal events from said database based upon said changed temporal constraints;

upon reaching said end of said lifespan of each of said temporal events, permanently removing from said database said alarm associated with said ones of said temporal events permanently removed from said database;

combining said temporal events using a sequence operator to form a composite event; and associating a lifespan to said composite event using said sequence operator.

14. The method of claim 1, further comprising using a separate device external to said database to detect said composite event.

15. The method of claim 1, wherein at least one of said temporal events consists of an instantaneous and atomic point of occurrence within an application that affects a state of said database.

16. The non-transitory program storage device medium of claim 13, wherein said method further comprises using a separate device external to said database to detect said composite events.

17. The non-transitory program storage device medium of claim 13, wherein at least one of said temporal events consists of an instantaneous and atomic point of occurrence within an application that affects a state of said database.

* * * * *